United States Patent
Visin et al.

(10) Patent No.: US 11,320,193 B2
(45) Date of Patent: May 3, 2022

(54) VACUUM INSULATED STRUCTURE TRIM BREAKER

(71) Applicant: WHIRLPOOL CORPORATION, Benton Harbor, MI (US)

(72) Inventors: Jerry M. Visin, Benton Habor, MI (US); Lynne F. Hunter, Dorr, MI (US); Paul B. Allard, Coloma, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 648 days.

(21) Appl. No.: 16/306,715

(22) PCT Filed: Jul. 26, 2016

(86) PCT No.: PCT/US2016/043983
§ 371 (c)(1),
(2) Date: Dec. 3, 2018

(87) PCT Pub. No.: WO2018/022007
PCT Pub. Date: Feb. 1, 2018

(65) Prior Publication Data
US 2019/0128591 A1 May 2, 2019

(51) Int. Cl.
*F25D 23/02* (2006.01)
*F25D 23/08* (2006.01)

(52) U.S. Cl.
CPC .......... *F25D 23/028* (2013.01); *F25D 23/02* (2013.01); *F25D 23/085* (2013.01);
(Continued)

(58) Field of Classification Search
CPC ...... F25D 23/028; F25D 23/02; F25D 23/085; F25D 2323/02; F25D 2201/14; F25D 23/066; F25D 23/087; Y02B 40/00
See application file for complete search history.

(56) References Cited

U.S. PATENT DOCUMENTS

| 948,541 A | 2/1910 | Coleman |
| 1,275,511 A | 8/1918 | Welch |

(Continued)

FOREIGN PATENT DOCUMENTS

| CA | 626838 A | 5/1961 |
| CA | 1320631 | 7/1993 |

(Continued)

OTHER PUBLICATIONS

Cai et al., "Generation of Metal Nanoparticles by Laser Ablation of Microspheres," J. Aerosol Sci., vol. 29, No. 5/6 (1998), pp. 627-636.
(Continued)

*Primary Examiner* — Hanh V Tran
(74) *Attorney, Agent, or Firm* — Price Heneveld LLP (57) ABSTRACT

A refrigeration appliance door is provided that includes a door wrapper forming an exterior of the appliance door. The door wrapper defines a wrapper flange defining a plurality of wrapper protrusions. A door liner defines a liner flange. The liner flange defines a plurality of liner protrusions. The door wrapper and the door liner are in a spaced apart configuration. A trim breaker defines a wrapper groove, a liner groove and a gasket groove. The wrapper flange is centered within the wrapper groove and the liner flange is centered within the liner groove. An adhesive is positioned within each of the wrapper and liner grooves. A portion of a gasket is positioned within the gasket groove of the trim breaker.

19 Claims, 6 Drawing Sheets

(52) U.S. Cl.
CPC ...... *F25D 2201/14* (2013.01); *F25D 2323/02* (2013.01); *Y02B 40/00* (2013.01)

(56) References Cited

U.S. PATENT DOCUMENTS

| | | | |
|---|---|---|---|
| 1,849,369 A | 3/1932 | Frost | |
| 1,921,576 A | 8/1933 | Muffly | |
| 2,108,212 A | 2/1938 | Schellens | |
| 2,128,336 A | 8/1938 | Torstensson | |
| 2,164,143 A | 6/1939 | Munters | |
| 2,190,954 A * | 2/1940 | Stickel | F25D 23/082 |
| | | | 220/592.06 |
| 2,191,659 A | 2/1940 | Hintze | |
| 2,318,744 A | 5/1943 | Brown | |
| 2,356,827 A | 8/1944 | Coss | |
| 2,432,042 A | 12/1947 | Richard | |
| 2,439,602 A | 4/1948 | Heritage | |
| 2,439,603 A | 4/1948 | Heritage | |
| 2,451,884 A | 10/1948 | Stelzer | |
| 2,538,780 A | 1/1951 | Hazard | |
| 2,559,356 A | 7/1951 | Hedges | |
| 2,644,605 A | 7/1953 | Palmer | |
| 2,729,863 A | 1/1956 | Kurtz | |
| 2,768,046 A | 10/1956 | Evans | |
| 2,809,764 A * | 10/1957 | Diamond | F25D 23/085 |
| | | | 220/592.06 |
| 2,817,123 A | 12/1957 | Jacobs | |
| 2,942,438 A | 6/1960 | Schmeling | |
| 2,985,075 A | 5/1961 | Knutsson-Hall | |
| 3,086,830 A | 4/1963 | Malia | |
| 3,125,388 A | 3/1964 | Costantini et al. | |
| 3,137,900 A | 6/1964 | Carbary | |
| 3,165,221 A * | 1/1965 | Kasady | F25D 23/064 |
| | | | 220/592.06 |
| 3,218,111 A | 11/1965 | Steiner | |
| 3,258,883 A | 7/1966 | Louis et al. | |
| 3,290,893 A * | 12/1966 | Haldopoulos | F25D 17/065 |
| | | | 62/187 |
| 3,338,451 A | 8/1967 | Kesling | |
| 3,353,301 A | 11/1967 | Heilweil et al. | |
| 3,353,321 A | 11/1967 | Heilweil et al. | |
| 3,358,059 A | 12/1967 | Snyder | |
| 3,379,481 A | 4/1968 | Fisher | |
| 3,408,316 A | 10/1968 | Mueller et al. | |
| 3,471,416 A | 10/1969 | Fijal | |
| 3,597,850 A | 8/1971 | Jenkins | |
| 3,607,169 A | 9/1971 | Coxe | |
| 3,632,012 A | 1/1972 | Kitson | |
| 3,633,783 A * | 1/1972 | Aue | F25D 23/085 |
| | | | 220/592.06 |
| 3,634,971 A | 1/1972 | Kesling | |
| 3,635,536 A | 1/1972 | Lackey et al. | |
| 3,670,521 A | 6/1972 | Dodge, III et al. | |
| 3,688,384 A | 9/1972 | Mizushima et al. | |
| 3,769,770 A | 11/1973 | Deschamps et al. | |
| 3,862,880 A | 1/1975 | Feldman | |
| 3,868,829 A | 3/1975 | Mann et al. | |
| 3,869,873 A * | 3/1975 | Thomas | F25D 23/082 |
| | | | 62/275 |
| 3,875,683 A | 4/1975 | Waters | |
| 3,910,658 A | 10/1975 | Lindenschmidt | |
| 3,933,398 A | 1/1976 | Haag | |
| 3,935,787 A | 2/1976 | Fisher | |
| 4,005,919 A | 2/1977 | Hoge et al. | |
| 4,006,947 A | 2/1977 | Haag et al. | |
| 4,043,624 A | 8/1977 | Lindenschmidt | |
| 4,050,145 A | 9/1977 | Benford | |
| 4,067,628 A | 1/1978 | Sherburn | |
| 4,118,266 A | 10/1978 | Kerr | |
| 4,134,518 A * | 1/1979 | Menchen | F25D 23/085 |
| | | | 220/592.06 |
| 4,170,391 A | 10/1979 | Bottger | |
| 4,242,241 A | 12/1980 | Rosen et al. | |
| 4,260,876 A | 4/1981 | Hochheiser | |
| 4,303,730 A | 12/1981 | Torobin | |
| 4,303,732 A | 12/1981 | Torobin | |
| 4,305,230 A * | 12/1981 | Gerritsen | F25D 23/087 |
| | | | 49/478.1 |
| 4,325,734 A | 4/1982 | Burrage et al. | |
| 4,330,310 A | 5/1982 | Tate, Jr. et al. | |
| 4,332,429 A | 6/1982 | Frick | |
| 4,396,362 A | 8/1983 | Thompson et al. | |
| 4,417,382 A | 11/1983 | Schilf | |
| 4,441,301 A * | 4/1984 | Benson | E04C 2/292 |
| | | | 49/490.1 |
| 4,492,368 A | 1/1985 | DeLeeuw et al. | |
| 4,529,368 A | 7/1985 | Makansi | |
| 4,548,196 A | 10/1985 | Torobin | |
| 4,583,796 A | 4/1986 | Nakajima et al. | |
| 4,660,271 A | 4/1987 | Lenhardt | |
| 4,671,909 A | 6/1987 | Torobin | |
| 4,671,985 A | 6/1987 | Rodrigues et al. | |
| 4,681,788 A | 7/1987 | Barito et al. | |
| 4,745,015 A * | 5/1988 | Cheng | B32B 7/12 |
| | | | 428/35.8 |
| 4,777,154 A | 10/1988 | Torobin | |
| 4,781,968 A | 11/1988 | Kellerman | |
| 4,805,293 A | 2/1989 | Buchser | |
| 4,826,040 A * | 5/1989 | Jahr, Jr | B29C 44/18 |
| | | | 220/592.11 |
| 4,865,875 A | 9/1989 | Kellerman | |
| 4,870,735 A | 10/1989 | Jahr et al. | |
| 4,914,341 A | 4/1990 | Weaver et al. | |
| 4,917,841 A | 4/1990 | Jenkins | |
| 5,007,226 A | 4/1991 | Nelson | |
| 5,018,328 A | 5/1991 | Cur et al. | |
| 5,033,636 A | 7/1991 | Jenkins | |
| 5,066,437 A | 11/1991 | Barito et al. | |
| 5,082,335 A | 1/1992 | Cur et al. | |
| 5,084,320 A | 1/1992 | Barito et al. | |
| 5,094,899 A | 3/1992 | Rusek, Jr. | |
| 5,118,174 A | 6/1992 | Benford et al. | |
| 5,121,593 A | 6/1992 | Forslund | |
| 5,157,893 A | 10/1992 | Benson et al. | |
| 5,168,674 A | 12/1992 | Molthen | |
| 5,171,346 A | 12/1992 | Hallett | |
| 5,175,975 A | 1/1993 | Benson et al. | |
| 5,212,143 A | 5/1993 | Torobin | |
| 5,221,136 A | 6/1993 | Hauck et al. | |
| 5,227,245 A | 7/1993 | Brands et al. | |
| 5,231,811 A | 8/1993 | Andrepont et al. | |
| 5,248,196 A | 9/1993 | Lynn et al. | |
| 5,251,455 A | 10/1993 | Cur et al. | |
| 5,252,408 A | 10/1993 | Bridges et al. | |
| 5,263,773 A | 11/1993 | Gable et al. | |
| 5,273,801 A | 12/1993 | Barry et al. | |
| 5,289,657 A * | 3/1994 | Kiel | F25D 23/082 |
| | | | 49/478.1 |
| 5,318,108 A | 6/1994 | Benson et al. | |
| 5,340,208 A | 8/1994 | Hauck et al. | |
| 5,353,868 A | 10/1994 | Abbott | |
| 5,359,795 A | 11/1994 | Mawby et al. | |
| 5,375,428 A | 12/1994 | LeClear et al. | |
| 5,397,759 A | 3/1995 | Torobin | |
| 5,418,055 A | 5/1995 | Chen et al. | |
| 5,433,056 A | 7/1995 | Benson et al. | |
| 5,477,676 A | 12/1995 | Benson et al. | |
| 5,500,287 A | 3/1996 | Henderson | |
| 5,500,305 A | 3/1996 | Bridges et al. | |
| 5,505,810 A | 4/1996 | Kirby et al. | |
| 5,507,999 A | 4/1996 | Cospey et al. | |
| 5,509,248 A | 4/1996 | Dellby et al. | |
| 5,512,345 A | 4/1996 | Tsutsumi et al. | |
| 5,532,034 A | 7/1996 | Kirby et al. | |
| 5,533,311 A | 7/1996 | Tirrell et al. | |
| 5,562,154 A | 10/1996 | Benson et al. | |
| 5,586,680 A | 12/1996 | Dellby et al. | |
| 5,599,081 A | 2/1997 | Revlett et al. | |
| 5,600,966 A | 2/1997 | Valence et al. | |
| 5,632,543 A | 5/1997 | McGrath et al. | |
| 5,640,828 A | 6/1997 | Reeves et al. | |
| 5,643,485 A * | 7/1997 | Potter | F01N 3/2889 |
| | | | 219/621 |
| 5,652,039 A | 7/1997 | Tremain et al. | |

(56) References Cited

U.S. PATENT DOCUMENTS

| | | | |
|---|---|---|---|
| 5,704,107 A | 1/1998 | Schmidt et al. | |
| 5,716,581 A | 2/1998 | Tirrell | |
| 5,720,536 A * | 2/1998 | Jenkins | F25D 23/085 312/401 |
| 5,768,837 A | 6/1998 | Sjoholm | |
| 5,792,801 A | 8/1998 | Tsuda et al. | |
| 5,813,454 A | 9/1998 | Potter | |
| 5,826,780 A | 10/1998 | Nesser et al. | |
| 5,827,385 A | 10/1998 | Meyer et al. | |
| 5,834,126 A | 11/1998 | Sheu | |
| 5,843,353 A | 12/1998 | De Vos et al. | |
| 5,866,228 A | 2/1999 | Awata | |
| 5,866,247 A | 2/1999 | Klatt et al. | |
| 5,868,890 A | 2/1999 | Fredrick | |
| 5,900,299 A | 5/1999 | Wynne | |
| 5,918,478 A | 7/1999 | Bostic et al. | |
| 5,924,295 A | 7/1999 | Park | |
| 5,950,395 A | 9/1999 | Takemasa et al. | |
| 5,952,404 A | 9/1999 | Simpson et al. | |
| 5,966,963 A | 10/1999 | Kovalaske | |
| 5,985,189 A | 11/1999 | Lynn et al. | |
| 6,013,700 A | 1/2000 | Asano et al. | |
| 6,063,471 A | 5/2000 | Dietrich et al. | |
| 6,094,922 A | 8/2000 | Ziegler | |
| 6,109,712 A | 8/2000 | Haworth et al. | |
| 6,128,914 A | 10/2000 | Tamaoki et al. | |
| 6,132,837 A | 10/2000 | Boes et al. | |
| 6,158,233 A | 12/2000 | Cohen et al. | |
| 6,163,976 A | 12/2000 | Tada et al. | |
| 6,164,030 A | 12/2000 | Dietrich | |
| 6,164,739 A | 12/2000 | Schultz et al. | |
| 6,187,256 B1 | 2/2001 | Aslan et al. | |
| 6,209,342 B1 | 4/2001 | Banicevic et al. | |
| 6,210,625 B1 | 4/2001 | Matsushita et al. | |
| 6,220,473 B1 | 4/2001 | Lehman et al. | |
| 6,221,456 B1 | 4/2001 | Pogorski et al. | |
| 6,224,179 B1 | 5/2001 | Wenning et al. | |
| 6,244,458 B1 | 6/2001 | Frysinger et al. | |
| 6,260,377 B1 | 7/2001 | Tamaoki et al. | |
| 6,266,970 B1 | 7/2001 | Nam et al. | |
| 6,294,595 B1 | 9/2001 | Tyagi et al. | |
| 6,305,768 B1 * | 10/2001 | Nishimoto | B29C 44/1242 220/592.09 |
| 6,336,693 B2 | 1/2002 | Nishimoto | |
| 6,390,378 B1 | 5/2002 | Briscoe, Jr. et al. | |
| 6,406,449 B1 | 6/2002 | Moore et al. | |
| 6,408,841 B1 | 6/2002 | Hirath et al. | |
| 6,415,623 B1 | 7/2002 | Jennings et al. | |
| 6,428,130 B1 | 8/2002 | Banicevic et al. | |
| 6,430,780 B1 | 8/2002 | Kim et al. | |
| 6,460,955 B1 | 10/2002 | Vaughan et al. | |
| 6,485,122 B2 * | 11/2002 | Wolf | F25D 23/062 220/592.06 |
| 6,519,919 B1 | 2/2003 | Takenouchi et al. | |
| 6,623,413 B1 | 9/2003 | Wynne | |
| 6,629,429 B1 | 10/2003 | Kawamura et al. | |
| 6,689,840 B1 | 2/2004 | Eustace et al. | |
| 6,716,501 B2 | 4/2004 | Kovalchuk et al. | |
| 6,736,472 B2 | 5/2004 | Banicevic | |
| 6,749,780 B2 | 6/2004 | Tobias | |
| 6,773,082 B2 | 8/2004 | Lee | |
| 6,855,766 B2 | 2/2005 | Oppenheimer-Stix et al. | |
| 6,858,280 B2 | 2/2005 | Allen et al. | |
| 6,860,082 B1 | 3/2005 | Yamamoto et al. | |
| 6,938,968 B2 | 9/2005 | Tanimoto et al. | |
| 7,008,032 B2 | 3/2006 | Chekal et al. | |
| 7,026,054 B2 | 4/2006 | Ikegawa et al. | |
| 7,197,792 B2 | 4/2007 | Moon | |
| 7,197,888 B2 | 4/2007 | LeClear et al. | |
| 7,207,181 B2 | 4/2007 | Murray et al. | |
| 7,210,308 B2 | 5/2007 | Tanimoto et al. | |
| 7,234,247 B2 | 6/2007 | Maguire | |
| 7,263,744 B2 | 9/2007 | Kim et al. | |
| 7,284,390 B2 | 10/2007 | Van Meter et al. | |
| 7,296,423 B2 | 11/2007 | Müller et al. | |
| 7,316,125 B2 | 1/2008 | Uekado et al. | |
| 7,343,757 B2 | 3/2008 | Egan et al. | |
| 7,360,371 B2 | 4/2008 | Feinauer et al. | |
| 7,449,227 B2 | 11/2008 | Echigoya et al. | |
| 7,475,562 B2 | 1/2009 | Jackovin | |
| 7,517,031 B2 | 4/2009 | Laible | |
| 7,614,244 B2 | 11/2009 | Venkatakrishnan et al. | |
| 7,625,622 B2 | 12/2009 | Teckoe et al. | |
| 7,641,298 B2 | 1/2010 | Hirath et al. | |
| 7,665,326 B2 | 2/2010 | LeClear et al. | |
| 7,703,217 B2 | 4/2010 | Tada et al. | |
| 7,703,824 B2 | 4/2010 | Kittelson et al. | |
| 7,757,511 B2 | 7/2010 | LeClear et al. | |
| 7,762,634 B2 | 7/2010 | Tenra et al. | |
| 7,794,805 B2 | 9/2010 | Aumaugher et al. | |
| 7,815,269 B2 | 10/2010 | Wenning et al. | |
| 7,842,269 B2 | 11/2010 | Schachtely et al. | |
| 7,845,745 B2 | 12/2010 | Gorz et al. | |
| 7,861,538 B2 | 1/2011 | Welle et al. | |
| 7,886,559 B2 | 2/2011 | Hell et al. | |
| 7,893,123 B2 | 2/2011 | Luisi | |
| 7,908,873 B1 | 3/2011 | Cur et al. | |
| 7,930,892 B1 | 4/2011 | Vonderhaar | |
| 7,938,148 B2 | 5/2011 | Carlier et al. | |
| 7,992,257 B2 | 8/2011 | Kim | |
| 8,049,518 B2 | 11/2011 | Wern et al. | |
| 8,074,469 B2 | 12/2011 | Hamel et al. | |
| 8,079,652 B2 | 12/2011 | Laible et al. | |
| 8,108,972 B2 | 2/2012 | Bae et al. | |
| 8,113,604 B2 | 2/2012 | Olson et al. | |
| 8,117,865 B2 | 2/2012 | Allard et al. | |
| 8,157,338 B2 | 4/2012 | Seo et al. | |
| 8,162,415 B2 | 4/2012 | Hagele et al. | |
| 8,163,080 B2 | 4/2012 | Meyer et al. | |
| 8,176,746 B2 | 5/2012 | Allard et al. | |
| 8,182,051 B2 | 5/2012 | Laible et al. | |
| 8,197,019 B2 | 6/2012 | Kim | |
| 8,202,599 B2 | 6/2012 | Henn | |
| 8,211,523 B2 | 7/2012 | Fujimori et al. | |
| 8,266,923 B2 | 9/2012 | Bauer et al. | |
| 8,281,558 B2 | 10/2012 | Hiemeyer et al. | |
| 8,299,656 B2 | 10/2012 | Mlard et al. | |
| 8,343,395 B2 | 1/2013 | Hu et al. | |
| 8,353,177 B2 | 1/2013 | Adamski et al. | |
| 8,382,219 B2 | 2/2013 | Hottmann et al. | |
| 8,434,317 B2 | 5/2013 | Besore | |
| 8,439,460 B2 | 5/2013 | Laible et al. | |
| 8,456,040 B2 | 6/2013 | Allard et al. | |
| 8,486,215 B2 * | 7/2013 | Amann | B29C 66/12449 156/293 |
| 8,491,070 B2 | 7/2013 | Davis et al. | |
| 8,516,845 B2 | 8/2013 | Wuesthoff et al. | |
| 8,528,284 B2 | 9/2013 | Aspenson et al. | |
| 8,590,992 B2 | 11/2013 | Lim et al. | |
| 8,717,029 B2 | 5/2014 | Chae et al. | |
| 8,739,568 B2 | 6/2014 | Allard et al. | |
| 8,752,918 B2 | 6/2014 | Kang | |
| 8,752,921 B2 | 6/2014 | Gorz et al. | |
| 8,763,847 B2 | 7/2014 | Mortarotti | |
| 8,764,133 B2 | 7/2014 | Park et al. | |
| 8,770,682 B2 | 7/2014 | Lee et al. | |
| 8,776,390 B2 | 7/2014 | Hanaoka et al. | |
| 8,840,204 B2 | 9/2014 | Bauer et al. | |
| 8,852,708 B2 | 10/2014 | Kim et al. | |
| 8,881,398 B2 | 11/2014 | Hanley et al. | |
| 8,905,503 B2 | 12/2014 | Sahasrabudhe et al. | |
| 8,943,770 B2 | 2/2015 | Sanders et al. | |
| 8,944,541 B2 | 2/2015 | Allard et al. | |
| 9,009,969 B2 | 4/2015 | Choi et al. | |
| RE45,501 E | 5/2015 | Maguire | |
| 9,056,952 B2 | 6/2015 | Eilbracht et al. | |
| 9,074,811 B2 | 7/2015 | Korkmaz | |
| 9,080,808 B2 | 7/2015 | Choi et al. | |
| 9,102,076 B2 | 8/2015 | Doshi et al. | |
| 9,103,482 B2 | 8/2015 | Fujimori et al. | |
| 9,125,546 B2 | 9/2015 | Kleemann et al. | |
| 9,140,480 B2 | 9/2015 | Kuehl et al. | |
| 9,140,481 B2 | 9/2015 | Cur et al. | |
| 9,170,045 B2 | 10/2015 | Oh et al. | |

(56) References Cited

U.S. PATENT DOCUMENTS

| | | |
|---|---|---|
| 9,170,046 B2 | 10/2015 | Jung et al. |
| 9,188,382 B2 | 11/2015 | Kim et al. |
| 8,955,352 B2 | 12/2015 | Lee et al. |
| 9,221,210 B2 | 12/2015 | Wu et al. |
| 9,228,386 B2 | 1/2016 | Thielmann et al. |
| 9,267,727 B2 | 2/2016 | Lim et al. |
| 9,303,915 B2 | 4/2016 | Kim et al. |
| 9,328,951 B2 | 5/2016 | Shin et al. |
| 9,353,984 B2 | 5/2016 | Kim et al. |
| 9,410,732 B2 | 8/2016 | Choi et al. |
| 9,423,171 B2 | 8/2016 | Betto |
| 9,429,356 B2 | 8/2016 | Kim et al. |
| 9,448,004 B2 | 9/2016 | Kim et al. |
| 9,463,917 B2 | 10/2016 | Wu et al. |
| 9,482,463 B2 | 11/2016 | Choi et al. |
| 9,506,689 B2 | 11/2016 | Carbajal et al. |
| 9,518,777 B2 | 12/2016 | Lee et al. |
| 9,568,238 B2 | 2/2017 | Kim et al. |
| D781,641 S | 3/2017 | Incukur |
| D781,642 S | 3/2017 | Incukur |
| 9,605,891 B2 | 3/2017 | Lee et al. |
| 9,696,085 B2 | 7/2017 | Seo et al. |
| 9,702,621 B2 | 7/2017 | Cho et al. |
| 9,759,479 B2 | 9/2017 | Ramm et al. |
| 9,777,958 B2 | 10/2017 | Choi et al. |
| 9,791,204 B2 | 10/2017 | Kim et al. |
| 9,791,205 B2 * | 10/2017 | Mukherjee .............. F25D 23/063 |
| 9,833,942 B2 | 12/2017 | Wu et al. |
| 10,584,914 B2 * | 3/2020 | Jung ....................... F25D 23/06 |
| 10,753,669 B2 * | 8/2020 | Dherde ................. F25D 23/028 |
| 10,852,054 B2 * | 12/2020 | Kim ....................... F25D 21/04 |
| 10,907,890 B2 * | 2/2021 | Deka ...................... F25D 23/065 |
| 10,914,511 B2 * | 2/2021 | Naik ...................... F25D 23/064 |
| 2002/0004111 A1 | 1/2002 | Matsubara et al. |
| 2002/0041134 A1 * | 4/2002 | Wolf ...................... F25D 23/085 |
| | | 312/400 |
| 2002/0114937 A1 | 8/2002 | Albert et al. |
| 2002/0144482 A1 | 10/2002 | Henson et al. |
| 2002/0168496 A1 | 11/2002 | Morimoto et al. |
| 2003/0008100 A1 | 1/2003 | Horn |
| 2003/0041612 A1 | 3/2003 | Piloni et al. |
| 2003/0056334 A1 | 3/2003 | Finkelstein |
| 2003/0157284 A1 | 8/2003 | Tanimoto et al. |
| 2003/0167789 A1 | 9/2003 | Tanimoto et al. |
| 2003/0173883 A1 | 9/2003 | Koons |
| 2004/0144130 A1 | 7/2004 | Jung |
| 2004/0178707 A1 | 9/2004 | Avendano et al. |
| 2004/0180176 A1 | 9/2004 | Rusek |
| 2004/0226141 A1 | 11/2004 | Yates et al. |
| 2004/0253406 A1 | 12/2004 | Hayashi et al. |
| 2005/0042247 A1 | 2/2005 | Gomoll et al. |
| 2005/0229614 A1 | 10/2005 | Ansted |
| 2005/0235682 A1 | 10/2005 | Hirai et al. |
| 2006/0064846 A1 | 3/2006 | Espendola et al. |
| 2006/0076863 A1 | 4/2006 | Echigoya et al. |
| 2006/0201189 A1 | 9/2006 | Adamski et al. |
| 2006/0261718 A1 | 11/2006 | Miseki et al. |
| 2006/0263571 A1 | 11/2006 | Tsunetsugu et al. |
| 2006/0266075 A1 | 11/2006 | Itsuki et al. |
| 2007/0001563 A1 | 1/2007 | Park et al. |
| 2007/0099502 A1 | 5/2007 | Ferinauer et al. |
| 2007/0176526 A1 | 8/2007 | Gomoll et al. |
| 2007/0266654 A1 | 11/2007 | Noale |
| 2008/0044488 A1 | 2/2008 | Zimmer et al. |
| 2008/0048540 A1 | 2/2008 | Kim |
| 2008/0138458 A1 | 6/2008 | Ozasa et al. |
| 2008/0196441 A1 | 8/2008 | Ferreira |
| 2008/0300356 A1 | 12/2008 | Meyer et al. |
| 2008/0309210 A1 | 12/2008 | Luisi et al. |
| 2009/0032541 A1 | 2/2009 | Rogala et al. |
| 2009/0056367 A1 | 3/2009 | Nuemann |
| 2009/0058244 A1 | 3/2009 | Cho et al. |
| 2009/0113925 A1 | 5/2009 | Korkmaz |
| 2009/0131571 A1 | 5/2009 | Fraser et al. |
| 2009/0179541 A1 | 7/2009 | Smith et al. |
| 2009/0205357 A1 | 8/2009 | Lim et al. |
| 2009/0302728 A1 | 12/2009 | Rotter et al. |
| 2009/0322470 A1 | 12/2009 | Yoo et al. |
| 2009/0324871 A1 | 12/2009 | Henn |
| 2010/0170279 A1 | 7/2010 | Aoki |
| 2010/0206464 A1 | 8/2010 | Heo et al. |
| 2010/0218543 A1 | 9/2010 | Duchame |
| 2010/0231109 A1 | 9/2010 | Matzke et al. |
| 2010/0287843 A1 | 11/2010 | Oh |
| 2010/0287974 A1 | 11/2010 | Cur et al. |
| 2010/0293984 A1 | 11/2010 | Adamski et al. |
| 2010/0295435 A1 | 11/2010 | Kendall et al. |
| 2011/0011119 A1 | 1/2011 | Kuehl et al. |
| 2011/0023527 A1 | 2/2011 | Kwon et al. |
| 2011/0030894 A1 | 2/2011 | Tenra et al. |
| 2011/0095669 A1 | 4/2011 | Moon et al. |
| 2011/0146325 A1 | 6/2011 | Lee |
| 2011/0146335 A1 | 6/2011 | Jung et al. |
| 2011/0165367 A1 | 7/2011 | Kojima et al. |
| 2011/0215694 A1 | 9/2011 | Fink et al. |
| 2011/0220662 A1 | 9/2011 | Kim et al. |
| 2011/0241513 A1 | 10/2011 | Nomura et al. |
| 2011/0241514 A1 | 10/2011 | Nomura et al. |
| 2011/0260351 A1 | 10/2011 | Corradi et al. |
| 2011/0290808 A1 | 12/2011 | Bai et al. |
| 2011/0309732 A1 | 12/2011 | Horil et al. |
| 2011/0315693 A1 | 12/2011 | Cur et al. |
| 2012/0000234 A1 | 1/2012 | Adamski et al. |
| 2012/0011879 A1 | 1/2012 | Gu |
| 2012/0060544 A1 | 3/2012 | Lee et al. |
| 2012/0099255 A1 | 4/2012 | Lee et al. |
| 2012/0103006 A1 | 5/2012 | Jung et al. |
| 2012/0104923 A1 | 5/2012 | Jung et al. |
| 2012/0118002 A1 | 5/2012 | Kim et al. |
| 2012/0137501 A1 | 6/2012 | Allard et al. |
| 2012/0152151 A1 | 6/2012 | Meyer et al. |
| 2012/0196059 A1 | 8/2012 | Fujimori et al. |
| 2012/0231204 A1 | 9/2012 | Jeon et al. |
| 2012/0237715 A1 | 9/2012 | McCraken |
| 2012/0240612 A1 | 9/2012 | Wusthoff et al. |
| 2012/0273111 A1 | 11/2012 | Nomura et al. |
| 2012/0279247 A1 | 11/2012 | Katu et al. |
| 2012/0280608 A1 | 11/2012 | Park et al. |
| 2012/0285971 A1 | 11/2012 | Junge et al. |
| 2012/0297813 A1 | 11/2012 | Hanley et al. |
| 2012/0324937 A1 | 12/2012 | Adamski et al. |
| 2013/0026900 A1 | 1/2013 | Oh et al. |
| 2013/0033163 A1 | 2/2013 | Kang |
| 2013/0043780 A1 | 2/2013 | Ootsuka et al. |
| 2013/0068990 A1 | 3/2013 | Eilbracht et al. |
| 2013/0111941 A1 | 5/2013 | Yu et al. |
| 2013/0221819 A1 | 8/2013 | Wing |
| 2013/0255304 A1 | 10/2013 | Cur et al. |
| 2013/0256318 A1 | 10/2013 | Kuehl et al. |
| 2013/0256319 A1 | 10/2013 | Kuehl et al. |
| 2013/0257256 A1 | 10/2013 | Allard et al. |
| 2013/0257257 A1 | 10/2013 | Cur et al. |
| 2013/0264439 A1 | 10/2013 | Allard et al. |
| 2013/0270732 A1 | 10/2013 | Wu et al. |
| 2013/0285527 A1 | 10/2013 | Choi et al. |
| 2013/0293080 A1 | 11/2013 | Kim et al. |
| 2013/0305535 A1 | 11/2013 | Cur et al. |
| 2013/0328472 A1 | 12/2013 | Shim et al. |
| 2014/0009055 A1 | 1/2014 | Cho et al. |
| 2014/0097733 A1 | 4/2014 | Seo et al. |
| 2014/0132144 A1 | 5/2014 | Kim et al. |
| 2014/0166926 A1 | 6/2014 | Lee et al. |
| 2014/0171578 A1 | 6/2014 | Meyer et al. |
| 2014/0190978 A1 | 7/2014 | Bowman et al. |
| 2014/0196305 A1 | 7/2014 | Smith |
| 2014/0216706 A1 | 8/2014 | Melton et al. |
| 2014/0232250 A1 | 8/2014 | Kim et al. |
| 2014/0260332 A1 | 9/2014 | Wu |
| 2014/0346942 A1 | 11/2014 | Kim et al. |
| 2014/0364527 A1 | 12/2014 | Wintermantel et al. |
| 2015/0011668 A1 | 1/2015 | Kolb et al. |
| 2015/0015133 A1 | 1/2015 | Carbajal et al. |
| 2015/0017386 A1 | 1/2015 | Kolb et al. |
| 2015/0027628 A1 | 1/2015 | Cravens et al. |

(56) References Cited

U.S. PATENT DOCUMENTS

| | | |
|---|---|---|
| 2015/0059399 A1 | 3/2015 | Hwang et al. |
| 2015/0115790 A1 | 4/2015 | Ogg |
| 2015/0147514 A1 | 5/2015 | Shinohara et al. |
| 2015/0159936 A1 | 6/2015 | Oh et al. |
| 2015/0168050 A1 | 6/2015 | Cur et al. |
| 2015/0176888 A1 | 6/2015 | Cur et al. |
| 2015/0184923 A1 | 7/2015 | Jeon |
| 2015/0190840 A1 | 7/2015 | Muto et al. |
| 2015/0224685 A1 | 8/2015 | Amstutz |
| 2015/0241115 A1 | 8/2015 | Strauss et al. |
| 2015/0241118 A1 | 8/2015 | Wu |
| 2015/0285551 A1 | 10/2015 | Aiken et al. |
| 2016/0084567 A1 | 3/2016 | Fernandez et al. |
| 2016/0116100 A1 | 4/2016 | Thiery et al. |
| 2016/0123055 A1 | 5/2016 | Ueyama |
| 2016/0161175 A1 | 6/2016 | Benold et al. |
| 2016/0178267 A1 | 6/2016 | Hao et al. |
| 2016/0178269 A1 | 6/2016 | Hiemeyer et al. |
| 2016/0235201 A1 | 8/2016 | Soot |
| 2016/0240839 A1 | 8/2016 | Umeyama et al. |
| 2016/0258671 A1* | 9/2016 | Allard ................ F25D 23/085 |
| 2016/0290702 A1 | 10/2016 | Sexton et al. |
| 2016/0348957 A1 | 12/2016 | Hitzelberger et al. |
| 2017/0038126 A1 | 2/2017 | Lee et al. |
| 2017/0157809 A1 | 6/2017 | Deka et al. |
| 2017/0176086 A1 | 6/2017 | Kang |
| 2017/0184339 A1 | 6/2017 | Liu et al. |
| 2017/0191746 A1 | 7/2017 | Seo |
| 2017/0325634 A1* | 11/2017 | Cai ..................... A47J 41/022 |

FOREIGN PATENT DOCUMENTS

| | | |
|---|---|---|
| CA | 2259665 | 1/1998 |
| CA | 2640006 | 8/2007 |
| CN | 1158509 | 9/1997 |
| CN | 1970185 | 5/2007 |
| CN | 100359272 | 1/2008 |
| CN | 101437756 | 5/2009 |
| CN | 201680116 | 12/2010 |
| CN | 201748744 U | 2/2011 |
| CN | 102296714 | 12/2011 |
| CN | 102452522 | 5/2012 |
| CN | 102717578 A | 10/2012 |
| CN | 102720277 | 10/2012 |
| CN | 103072321 | 5/2013 |
| CN | 202973713 U | 6/2013 |
| CN | 203331442 | 12/2013 |
| CN | 104816478 A | 8/2015 |
| CN | 105115221 | 12/2015 |
| CN | 204963379 U | 1/2016 |
| DE | 1150190 | 6/1963 |
| DE | 114139 A1 | 7/1975 |
| DE | 4110292 A1 | 10/1992 |
| DE | 4409091 | 9/1995 |
| DE | 19818890 | 11/1999 |
| DE | 19914105 | 9/2000 |
| DE | 19915311 | 10/2000 |
| DE | 102008026528 | 12/2009 |
| DE | 102009046810 | 5/2011 |
| DE | 102010024951 | 12/2011 |
| DE | 102011051178 A1 | 12/2012 |
| DE | 102012223536 | 6/2014 |
| DE | 102012223541 | 6/2014 |
| EP | 0480451 | 4/1992 |
| EP | 0645576 A1 | 3/1995 |
| EP | 0691518 | 1/1996 |
| EP | 0260699 | 3/1998 |
| EP | 0860669 | 8/1998 |
| EP | 1087186 | 3/2001 |
| EP | 1200785 | 5/2002 |
| EP | 1243880 | 9/2002 |
| EP | 1484563 | 12/2004 |
| EP | 1496322 | 1/2005 |
| EP | 1505359 | 2/2005 |
| EP | 1602425 A1 | 12/2005 |
| EP | 1624263 A2 | 8/2006 |
| EP | 2342511 | 7/2011 |
| EP | 2543942 A2 | 1/2013 |
| EP | 2607073 | 6/2013 |
| EP | 2730870 A2 | 5/2014 |
| EP | 2789951 | 10/2014 |
| EP | 2878427 A1 | 6/2015 |
| FR | 2980963 | 4/2013 |
| FR | 2991698 A1 | 12/2013 |
| GB | 837929 | 6/1960 |
| GB | 1214548 | 12/1970 |
| JP | S4828353 | 8/1973 |
| JP | S5157777 | 5/1976 |
| JP | S5253465 U | 4/1977 |
| JP | S59191588 | 12/1984 |
| JP | 403013779 | 1/1991 |
| JP | 404165197 | 6/1992 |
| JP | 04165197 | 10/1992 |
| JP | 04309778 A | 11/1992 |
| JP | H06159922 | 6/1994 |
| JP | H071479 | 1/1995 |
| JP | H07167377 | 7/1995 |
| JP | 08145547 A | 7/1996 |
| JP | H08300052 | 11/1996 |
| JP | H08303686 | 11/1996 |
| JP | H09166271 | 6/1997 |
| JP | H10113983 | 5/1998 |
| JP | 11159693 A | 6/1999 |
| JP | H11311395 | 11/1999 |
| JP | H11336990 | 12/1999 |
| JP | 2000097390 | 4/2000 |
| JP | 20000117334 | 4/2000 |
| JP | 2000320958 A | 11/2000 |
| JP | 2001038188 | 2/2001 |
| JP | 2001116437 | 4/2001 |
| JP | 2001336691 | 12/2001 |
| JP | 2001343176 | 12/2001 |
| JP | 2002068853 | 3/2002 |
| JP | 3438948 | 8/2003 |
| JP | 3478771 | 12/2003 |
| JP | 2004303695 | 10/2004 |
| JP | 2005069596 A | 3/2005 |
| JP | 2005098637 A | 4/2005 |
| JP | 2005114015 | 4/2005 |
| JP | 2005164193 | 6/2005 |
| JP | 2005256849 | 9/2005 |
| JP | 2006-///92 | 3/2006 |
| JP | 2006161834 A | 6/2006 |
| JP | 2006161945 | 6/2006 |
| JP | 3792801 | 7/2006 |
| JP | 2006200685 A | 8/2006 |
| JP | 2007263186 | 10/2007 |
| JP | 4111096 | 7/2008 |
| JP | 2008157431 | 7/2008 |
| JP | 2008190815 | 8/2008 |
| JP | 2009063064 | 3/2009 |
| JP | 2009162402 | 7/2009 |
| JP | 2009524570 | 7/2009 |
| JP | 2010017437 | 1/2010 |
| JP | 2010071565 | 4/2010 |
| JP | 2010108199 | 5/2010 |
| JP | 2010145002 | 7/2010 |
| JP | 4545126 | 9/2010 |
| JP | 2010236770 | 10/2010 |
| JP | 2010276309 | 12/2010 |
| JP | 2011002033 | 1/2011 |
| JP | 2011069612 | 4/2011 |
| JP | 4779684 | 9/2011 |
| JP | 2011196644 | 10/2011 |
| JP | 2012026493 | 2/2012 |
| JP | 4897473 | 3/2012 |
| JP | 2012063029 | 3/2012 |
| JP | 2012087993 | 5/2012 |
| JP | 2012163258 | 8/2012 |
| JP | 2012189114 | 10/2012 |
| JP | 2012242075 | 12/2012 |
| JP | 2013002484 | 1/2013 |
| JP | 2013050242 | 3/2013 |
| JP | 2013050267 A | 3/2013 |

(56) References Cited

FOREIGN PATENT DOCUMENTS

| | | | |
|---|---|---|---|
| JP | 2013076471 A | 4/2013 |
| JP | 2013088036 | 5/2013 |
| JP | 2013195009 | 9/2013 |
| KR | 20020057547 | 7/2002 |
| KR | 20020080938 | 10/2002 |
| KR | 20030083812 | 11/2003 |
| KR | 20040000126 | 1/2004 |
| KR | 20050095357 A | 9/2005 |
| KR | 100620025 B1 | 9/2006 |
| KR | 20070044024 | 4/2007 |
| KR | 1020070065743 A | 6/2007 |
| KR | 20080103845 | 11/2008 |
| KR | 20090026045 | 3/2009 |
| KR | 101017776 | 2/2011 |
| KR | 20120007241 | 1/2012 |
| KR | 20120046621 | 5/2012 |
| KR | 20120051305 | 5/2012 |
| KR | 20150089495 A | 8/2015 |
| RU | 2061925 C1 | 6/1996 |
| RU | 2077411 C1 | 4/1997 |
| RU | 2081858 | 6/1997 |
| RU | 2132522 C2 | 6/1999 |
| RU | 2162576 C2 | 1/2001 |
| RU | 2166158 C1 | 4/2001 |
| RU | 2187433 C2 | 8/2002 |
| RU | 2234645 C1 | 8/2004 |
| RU | 2252377 | 5/2005 |
| RU | 2253792 C2 | 6/2005 |
| RU | 2349618 C2 | 3/2009 |
| RU | 2414288 C2 | 3/2011 |
| RU | 2422598 | 6/2011 |
| RU | 142892 | 7/2014 |
| RU | 2529525 C1 | 9/2014 |
| RU | 2571031 | 12/2015 |
| SU | 203707 | 12/1967 |
| SU | 00476407 A1 | 7/1975 |
| SU | 547614 | 5/1977 |
| SU | 648780 A1 | 2/1979 |
| SU | 01307186 A1 | 4/1987 |
| WO | 9614207 A1 | 5/1996 |
| WO | 9721767 | 6/1997 |
| WO | 098049506 | 11/1998 |
| WO | 9920961 A1 | 4/1999 |
| WO | 9920964 | 4/1999 |
| WO | 200160598 | 8/2001 |
| WO | 200202987 | 1/2002 |
| WO | 2002052208 | 4/2002 |
| WO | 02060576 A1 | 8/2002 |
| WO | 03072684 A1 | 9/2003 |
| WO | 2003089729 | 10/2003 |
| WO | 2004010042 A1 | 1/2004 |
| WO | 2006045694 | 5/2006 |
| WO | 2006073540 A2 | 7/2006 |
| WO | 2007033836 A1 | 3/2007 |
| WO | 2007085511 | 8/2007 |
| WO | 2007106067 A2 | 9/2007 |
| WO | 2008065453 | 6/2008 |
| WO | 2008077741 | 7/2008 |
| WO | 2008118536 A2 | 10/2008 |
| WO | 2008122483 A2 | 10/2008 |
| WO | 2009013106 A2 | 1/2009 |
| WO | 2009112433 A1 | 9/2009 |
| WO | 2009147106 | 12/2009 |
| WO | 2010007783 A1 | 1/2010 |
| WO | 2010029730 | 3/2010 |
| WO | 2010043009 | 4/2010 |
| WO | 2010092627 | 8/2010 |
| WO | 2010127947 | 11/2010 |
| WO | 2010127947 A2 | 11/2010 |
| WO | 2011003711 | 1/2011 |
| WO | 2011058678 | 5/2011 |
| WO | 2011058678 A1 | 5/2011 |
| WO | 2011081498 | 7/2011 |
| WO | 2012023705 | 2/2012 |
| WO | 2012026715 | 3/2012 |
| WO | 2012031885 | 3/2012 |
| WO | 2012043990 | 4/2012 |
| WO | 2012044001 | 4/2012 |
| WO | 2012085212 | 6/2012 |
| WO | 2012119892 | 9/2012 |
| WO | 2012152646 | 11/2012 |
| WO | 2013116103 | 8/2013 |
| WO | 2013116302 | 8/2013 |
| WO | 2014038150 | 3/2014 |
| WO | 2014038150 A1 | 3/2014 |
| WO | 2014095542 | 6/2014 |
| WO | 2014121893 A1 | 8/2014 |
| WO | 2014184393 | 11/2014 |
| WO | 2014184393 A1 | 11/2014 |
| WO | 2013140816 A1 | 8/2015 |
| WO | 2016082907 A1 | 6/2016 |
| WO | 2017029782 A1 | 2/2017 |

OTHER PUBLICATIONS

Raszewski et al., "Methods for Producing Hollow Glass Microspheres," Powerpoint, cached from Google, Jul. 2009, 6 pages.

* cited by examiner

VACUUM INSULATED STRUCTURE TRIM BREAKER

CROSS-REFERENCE TO RELATED APPLICATION

This application claims priority to International Application No. PCT/US/2016/043983, filed on Jul. 26, 2016, entitled "VACUUM INSULATED STRUCTURE TRIM BREAKER," the disclosure of which is hereby incorporated

FIELD

The present disclosure generally relates to vacuum insulated structures, and more particularly relates to vacuum insulated structure designs and methods for making the same.

BACKGROUND

Vacuum insulated structures offer the ability to reduce thermal energy conduction across the vacuum insulated structure as compared to traditional insulation methods. However, ensuring an airtight seal for the vacuum insulated structure is important to maintain thermal separation.

SUMMARY

According to one aspect of the present disclosure, a refrigeration appliance door is provided that includes a door wrapper forming an exterior of the appliance door. The door wrapper defines a wrapper flange defining a plurality of wrapper protrusions. A door liner defines a liner flange. The liner flange defines a plurality of liner protrusions. The door wrapper and the door liner are in a spaced apart configuration. A trim breaker defines a wrapper groove, a liner groove and a gasket groove. The wrapper flange is centered within the wrapper groove and the liner flange is centered within the liner groove. An adhesive is positioned within each of the wrapper and liner grooves. A portion of a gasket is positioned within the gasket groove of the trim breaker.

According to another aspect of the present disclosure, an appliance door is provided that includes a metallic door wrapper forming an exterior of the appliance door. The door wrapper defines a wrapper flange defining a plurality of wrapper protrusions. A metallic door liner defines a liner flange and the liner flange defines a plurality of liner protrusions. The door wrapper and the door liner are in a spaced apart configuration. A polymeric trim breaker defines a wrapper groove and a liner groove. The wrapper flange is centered within the wrapper groove and the liner flange is centered within the liner groove and an adhesive is positioned within each of the wrapper and liner grooves.

According to another aspect of the present disclosure, a vacuum insulated structure is provided that includes a wrapper defining a wrapper flange and a liner defining a liner flange. The wrapper and the liner are in a spaced apart configuration. A trim breaker defines a wrapper groove and a liner groove. The wrapper flange is centered within the wrapper groove and the liner flange is centered within the liner groove. A plurality of liner protrusions are defined by at least one of the liner flange and the trim breaker within the liner groove.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The present application is related to International Application No. PCT/US2016/043991, filed on Jul. 26, 2016, published as WO 2018/022009 A1, and entitled "THERMAL BRIDGEBREAKER AND SEAL FEATURES IN A THIN-WALLED VACUUM INSULATED STRUCTURE," and International Application No. PCT/US2016/043979, filed on Jul. 26, 2016, published as WO 2018/022006 A1, and entitled "A METHOD FOR MANUFACTURING AN INSULATED STRUCTURE FOR A REFRIGERATOR." The entire contents of these related applications are hereby incorporated by reference.

Referring now to FIGS. 1-5B, reference numeral 10 generally designates a refrigeration appliance. The refrigeration appliance 10 includes a door 14. The door 14 may include a wrapper 18 forming an exterior of the appliance door 14. The wrapper 18 defines a wrapper flange 22 defining a plurality of wrapper protrusions 26. A liner 30 defines a liner flange 34. The liner flange defines a plurality of liner protrusions 38. The wrapper 18 and the liner 30 are in a spaced apart configuration. A trim breaker 42 defines a wrapper groove 46, a liner groove 50 and a gasket groove 54. The wrapper flange 22 is centered within the wrapper groove 46 and the liner flange 30 is centered within the liner groove 50. An adhesive 58 is positioned within each of the wrapper and liner grooves 46, 50. The door 14 further includes a gasket 62. A portion of the gasket 62 is positioned within the gasket groove 54 of the trim breaker 42.

Figure 1:
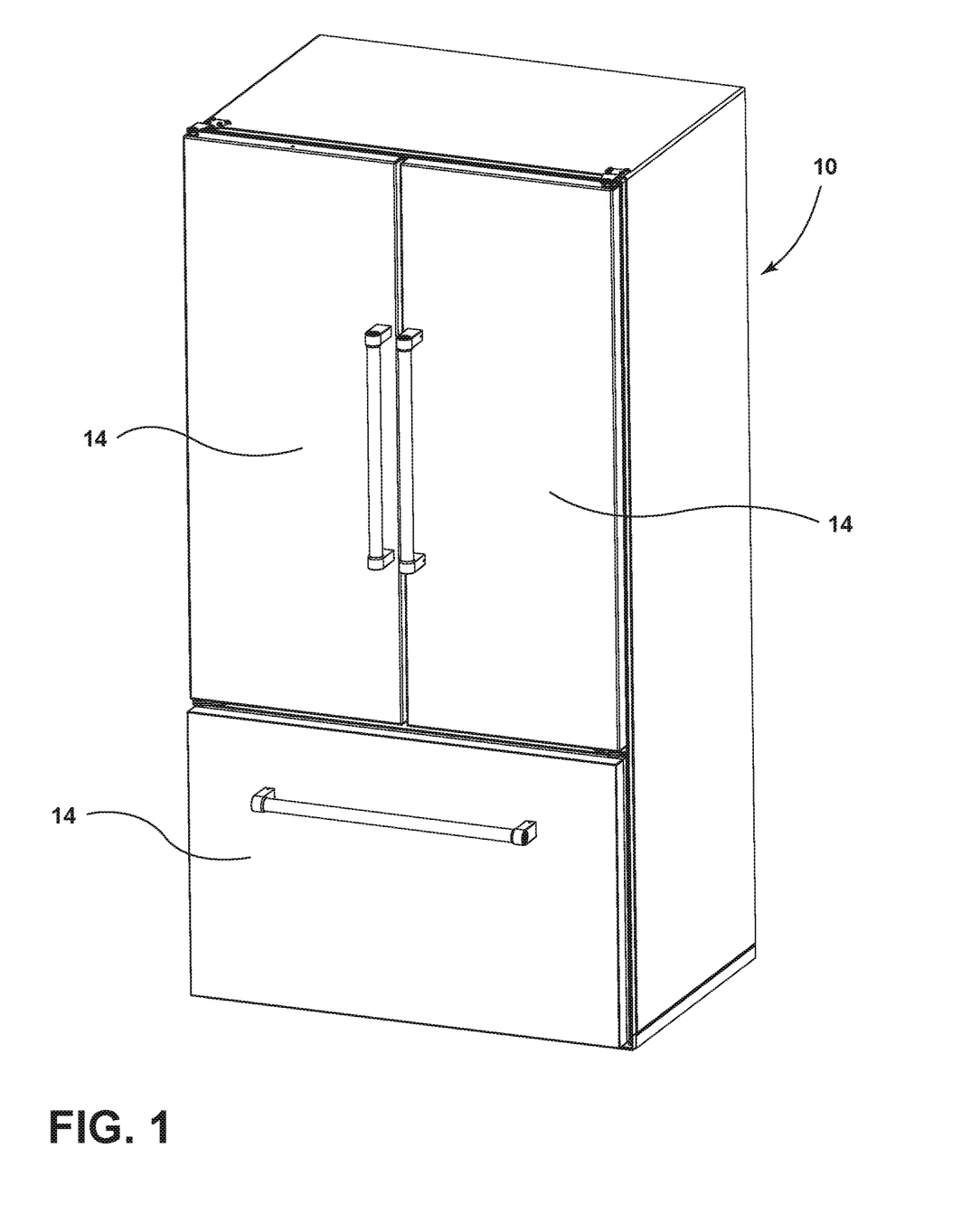
FIG. 1 is a front perspective view of a refrigeration appliance, according to one example.
Figure 2:
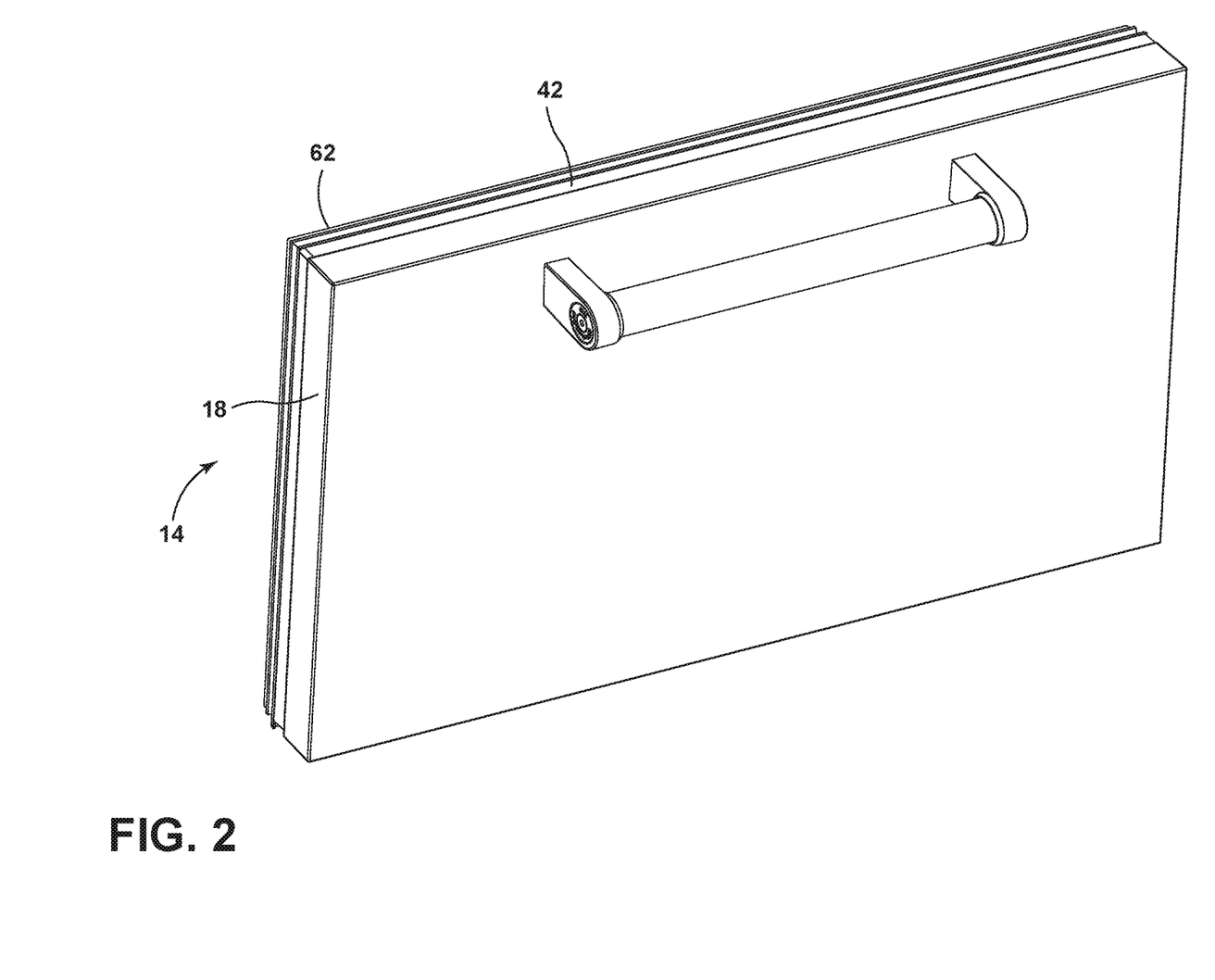
FIG. 2 is a top front perspective view of a freezer door of the refrigeration appliance of FIG. 1.

Referring now to FIGS. 1 and 2, the refrigeration appliance 10 is depicted as a French door bottom mount refrigerator, but it will be understood that this disclosure may equally be applied to freezers, walk in coolers and the like, without departing from the teachings provided herein. The refrigeration appliance 10 includes one or more doors 14 which may allow users of the refrigeration appliance 10 to place and remove items from within the refrigeration appliance 10. According to various examples, the refrigeration appliance 10 may include one or more vacuum insulated structures to aid in decreasing thermal conductivity between an interior and exterior of the appliance 10. As disclosed above, the door 14 may include the gasket 62. The gasket 62 may be composed of a rubber, polymeric material or other soft and pliable material configured to create a seal between the door 14 and the refrigeration appliance 10.

Figure 3:
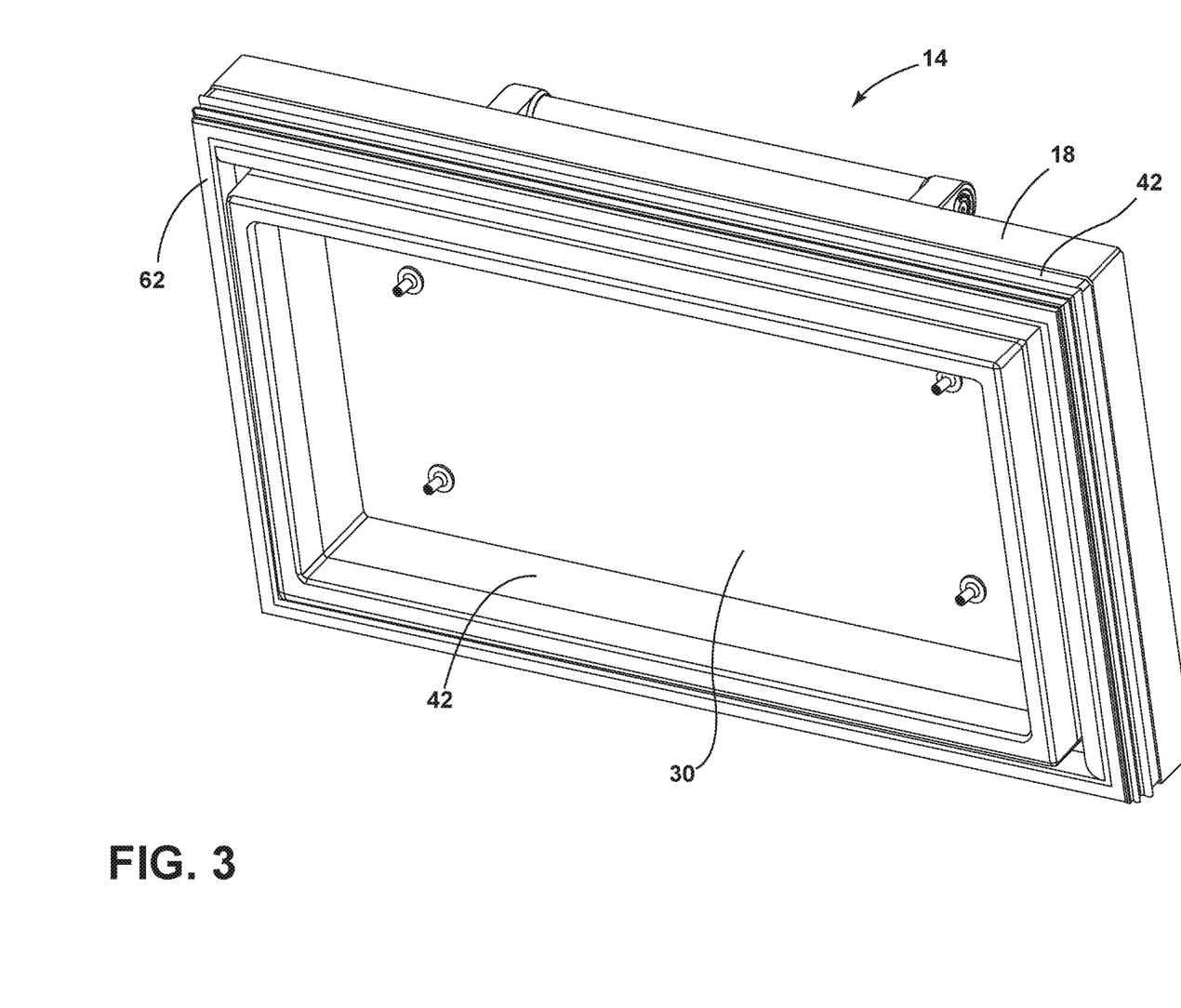
FIG. 3 is a top rear perspective view of the door of FIG. 2, according to one example.

Referring now to FIGS. 2 and 3, the door 14 may be a vacuum insulated structure, as explained above. In vacuum insulated structures, heat transmission through the vacuum insulated structure is decreased by creating a vacuum between the exterior walls of the structure. By creating a vacuum between the spaces intended to be thermally isolated, heat conduction is minimized because there is no, or less, material (e.g., air) to transfer the thermal energy between the thermally isolated spaces. In the depicted example, the door 14 includes the wrapper 18, the liner 30, the trim breaker 42 and the gasket 62. In the example of the door 14, the wrapper 18 and the liner 30 serve as the exterior and interior surfaces of the vacuum insulated structure, respectively. The wrapper 18 and liner 30 are configured in a spaced apart relationship to define a space therebetween. The space between the wrapper 18 and liner 30 may have an air pressure of less than about 1 atm, about 0.5 atm, about 0.4 atm, about 0.3 atm, about 0.2 atm, about 0.1 atm, about 0.01 atm, or less than about 0.001 atm. The wrapper 18 and/or liner 30 may be composed of a metal (e.g., stainless steel, carbon steel), a polymer, or combinations thereof.

Figure 4A:
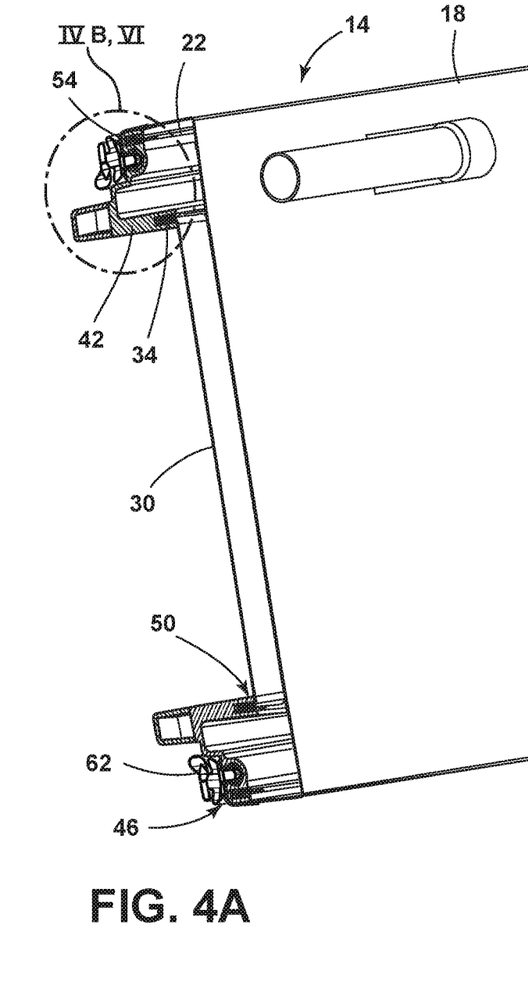
FIG. 4A is a cut away view of the door of FIG. 2, according to one example.
Figure 4B:
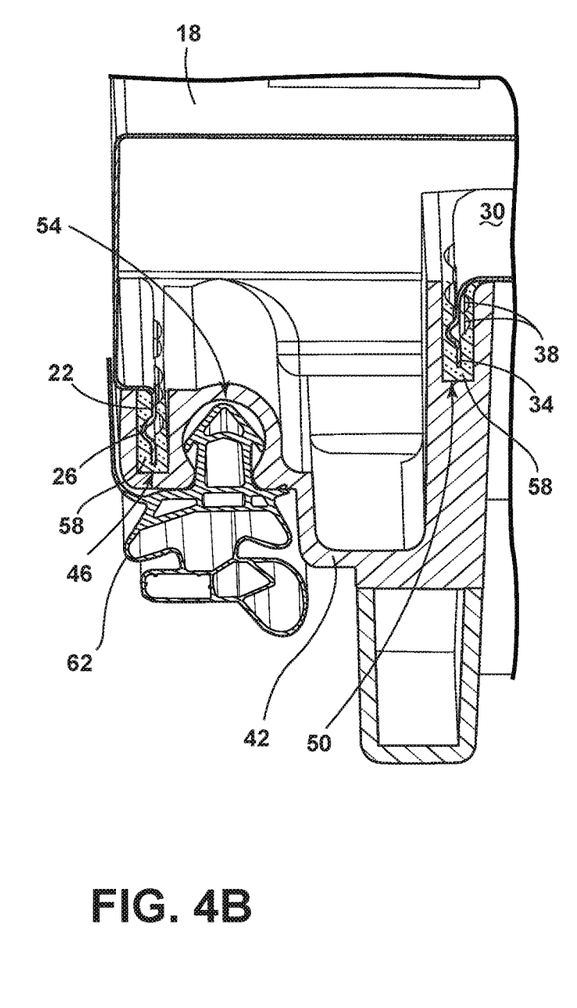
FIG. 4B is an enhanced view taken at area IVB of FIG. 4A.
Figure 5A:
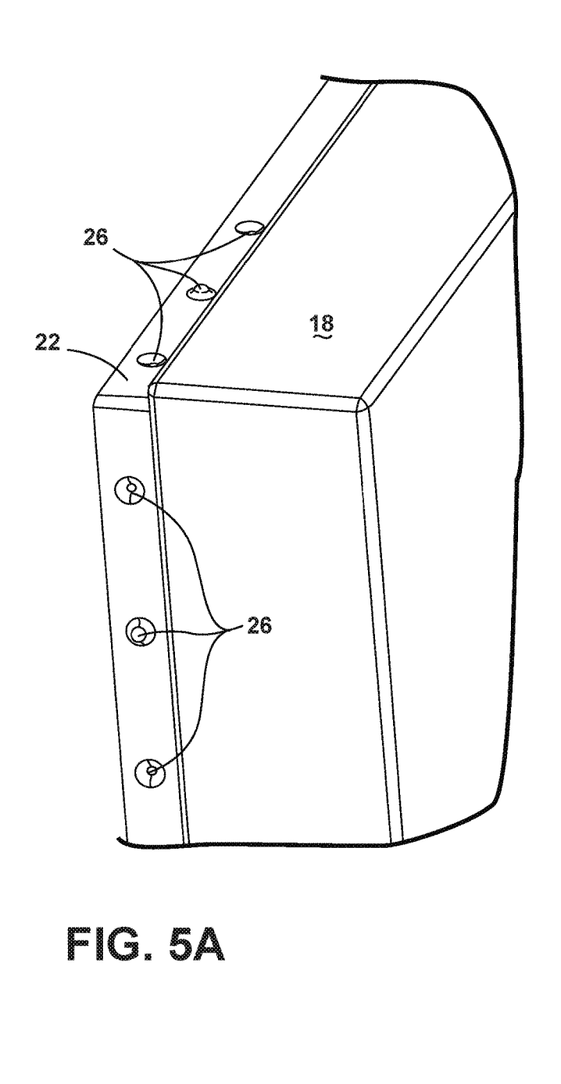
FIG. 5A is a detail top perspective view of a wrapper of the door of FIG. 2, according to one example.
Figure 5B:
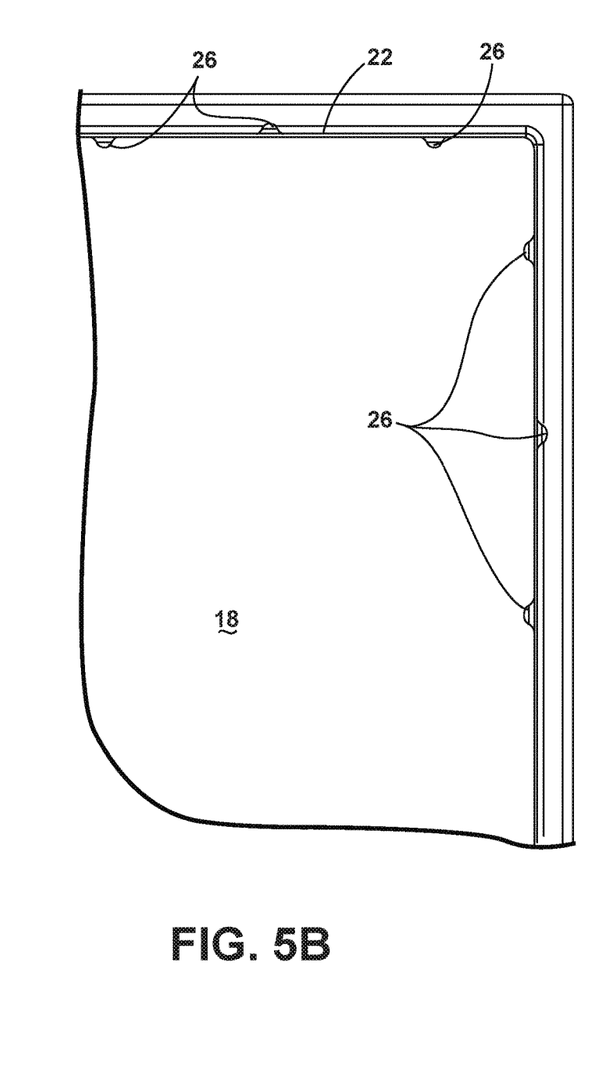
FIG. 5B is a detail rear elevational view of the wrapper of the door of FIG. 2, according to one example.

Referring now to FIGS. 4A and 4B, to maintain the vacuum between the wrapper 18 and the liner 30, the wrapper 18 and liner 30 are sealed to one another. Further, ideally, thermal energy is not transferred between the wrapper 18 and the liner 30 where the seal is made. In other words, the trim breaker 42 should not function as a "thermal bridge." According to various examples, the trim breaker 42 may be configured to join and seal the wrapper 18 and the liner 30 to one another. The trim breaker 42 may be composed of a thermally insulating material (e.g., a polymer, ceramic, or combinations thereof) such that thermal energy is transfer is minimized or eliminated between the wrapper 18 and the liner 30. As disclosed above, the trim breaker 42 defines the wrapper groove 46, the liner groove 50 and the gasket groove 54. The gasket groove 54 is configured to accept a portion of the gasket 62 such that the gasket 62 is held to the door 41 in a predetermined configuration. The wrapper groove 46 and the liner groove 50 are configured to accept the wrapper flange 22 and the liner flange 34, respectively. The wrapper groove 46 and the liner groove 50 are sized to accept the adhesive 58 and function as a "glue groove." Glue grooves are configured to accept a flange and hold the adhesive in place such that an air tight seal is formed.

Referring now to FIGS. 4A, 4B, 5A and 5B, the wrapper flange 22 and the liner flange 34 may be centered within the respective wrapper groove 46 and liner groove 50. Centering of the wrapper flange 22 may be accomplished using the wrapper protrusions 26. The wrapper protrusions 26 may be integrally formed by the wrapper flange 22, or may be separate components coupled (e.g., adhesively or mechanically) to the flange 22. For example, in integrally formed examples, the wrapper protrusions 26 may be stamped, or otherwise mechanically formed from the wrapper flange 22. In examples where the wrapper protrusions 26 are coupled to the wrapper flange 22, the flange 22 may define holes or coupling features for the protrusions 26 or may define flat portions to adhere the protrusions 26 to. In the depicted example, the wrapper protrusions 26 are all substantially hemispherical (e.g., "dimples"), but may be cuboid, pyramidal, generally rounded, other geometric shapes, or combinations thereof, without departing from the teachings provided herein. Further, it will be understood that the wrapper protrusions 26 may vary in shape and size across the wrapper flange 22 without departing from the teachings provided herein. The wrapper protrusions 26 extend outwardly from the wrapper flange 22 in opposite directions in an alternating manner. In other words, the wrapper protrusions 26 extend from opposite sides of the wrapper flange 22 such that every other protrusion 26 is on the same side of the wrapper flange 22. It will be understood that a variety of patterns and/or orders to the location and spacing of the wrapper protrusions 26 (e.g., two protrusions 26 on one side and one on the other, or two protrusions 26 on one side and two protrusions 26 on the other) may be implemented without departing from the teachings provided herein. The wrapper protrusions 26 may extend from the wrapper flange 22 sufficiently far enough to contact walls of the wrapper groove 46. As the wrapper protrusions 26 contact walls of the wrapper groove 46, the protrusions 26 may provide a self-centering feature to the wrapper flange 22.

Centering of the liner flange 34 may be accomplished using the liner protrusions 38. The liner protrusions 38 may be integrally formed by the liner flange 34, or may be separate components coupled (e.g., adhesively or mechanically) to the flange 34. For example, in integrally formed examples, the liner protrusions 38 may be stamped, or otherwise mechanically formed from the liner flange 34. In examples where the liner protrusions 38 are coupled to the liner flange 34, the flange 34 may define holes or coupling features for the protrusions 38 or may define flat portions to adhere the protrusions 38 to. In the depicted example, the liner protrusions 38 are all substantially hemispherical (e.g., "dimples"), but may be cuboid, pyramidal, generally rounded, other geometric shapes, or combinations thereof, without departing from the teachings provided herein. Further, it will be understood that the liner protrusions 38 may vary in shape and size across the liner flange 34 without departing from the teachings provided herein. The liner protrusions 38 extend outwardly from the liner flange 34 in opposite directions in an alternating manner. In other words, the liner protrusions 38 extend from opposite sides of the liner flange 34 such that every other protrusion 38 is on the same side of the liner flange 34. It will be understood that a variety of patterns and/or orders to the location and spacing of the liner protrusions 38 (e.g., two protrusions 38 on one side and one on the other, or two protrusions 38 on one side and two protrusions 38 on the other) may be implemented without departing from the teachings provided herein. The liner protrusions 38 may extend from the liner flange 34 sufficiently far enough to contact walls of the liner groove 50. As the liner protrusions 38 contact walls of the liner groove 50, the protrusions 38 may provide a self-centering feature to the liner flange 34.

To aid in filling of the wrapper and liner grooves 46, 50 with the adhesive 58, the wrapper and liner flanges 22, 34 may be scalloped, or have portions removed, along a bottom edge of the flanges 22, 34. The scalloped portions may correspond to locations on the wrapper and liner flanges 22, 34 proximate to the wrapper and liner protrusions 26, 38, or the scalloped portions may exist between the wrapper and liner protrusions 26, 38. The scalloped portions may allow the adhesive 58 to flow from one side of the wrapper and/or liner flanges 22, 34 to the other side such that the adhesive 58 fully surrounds the flanges 22, 34 and ensures an airtight seal.

Figure 6:
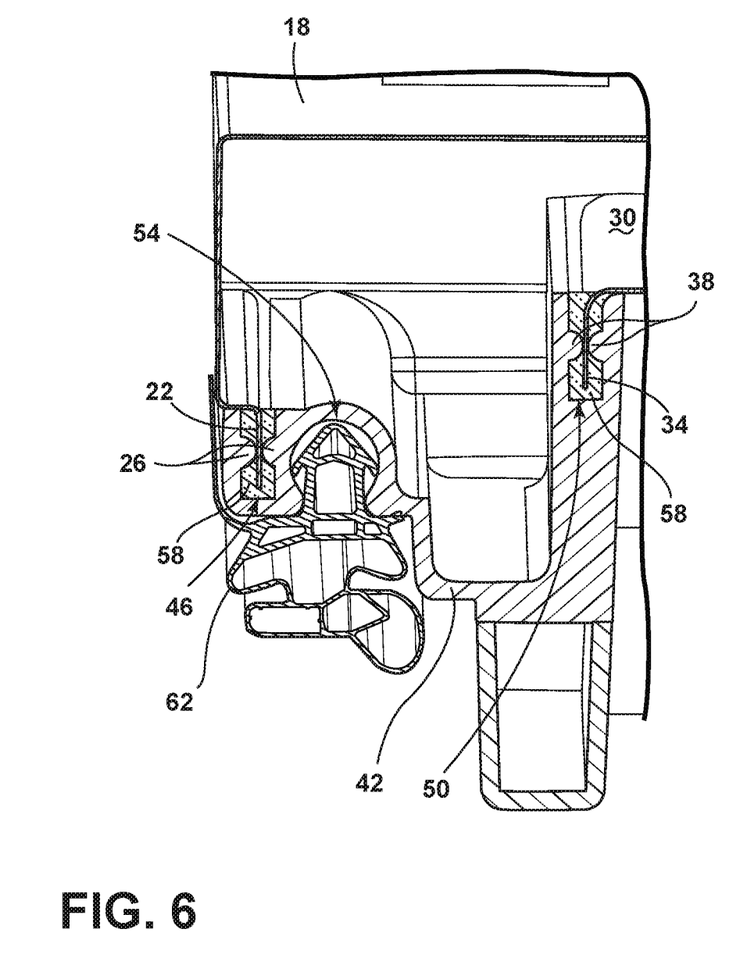
FIG. 6 is an enhanced view taken at area VI of FIG. 4A according to another example.

Referring now to FIG. 6, in an alternate example, the wrapper and liner protrusions 26, 38 may not be defined by the wrapper and liner flanges 22, 34, respectively, but may instead be defined within the wrapper and liner grooves 46, 50 by the trim breaker 42. It will be understood that in the example where the wrapper and liner protrusions 26, 38 are defined within the wrapper and liner grooves 46, 50, the protrusions 26, 38 may take any of the above described shapes and configurations described in connection with the flange defined examples. In the depicted example, the wrapper and liner flanges 22, 34 may be straight and/or flat and configured to slide between the respective wrapper and liner protrusions 26, 38. As such, the wrapper and liner flanges 22, 34 may contact the wrapper and liner protrusions 26, 38 thereby being centered within the wrapper and liner grooves 46, 50 similarly to that described above.

Use of the present disclosure may offer several advantages. First, use of the disclosed trim breaker 42 may allow for the formation of vacuum insulated panels which both hold a vacuum and reduce thermal energy flow between the components of the vacuum insulated panel. As explained above, by forming the trim breaker 42 of a thermally insulating material, the wrapper 18 and the liner 30 are thermally separated which reduces a heat bridging effect from occurring. Second, use of the wrapper protrusions 26 and the liner protrusions 38 allows for an easy manufacturing of a vacuum insulated structure as well as a secure seal. For example, by utilizing the wrapper protrusions 26 and the liner protrusions 38, the wrapper flange 22 and the liner flange 34 may quickly and easily be centered within the respective wrapper and liner grooves 46, 50. Further, because the wrapper and liner flanges 22, 34 are centered, the adhesive 58 may fill the wrapper and liner grooves 46, 50 and adhere to both sides of the flanges 46, 50 thereby ensuring an airtight seal is formed. In other words, the adhesive 58 is filled between the wrapper and liner protrusions 26, 38. Even further, by using the wrapper and liner protrusions 26, 38, the wrapper and liner flanges 22, 34 are less likely to move within the respective wrapper and liner grooves 46, 50 and break the seal of the adhesive 58. Third, although the foregoing description was described in connection with the doors 14, the trim breaker 42 may be applied to a number of locations within the refrigeration appliance 10. For example, spaces within a cabinet of the refrigeration appliance 10, or "pass throughs" (e.g., where wires, hoses or other lines move between the areas configured to be thermally isolated). Fourth, the disclosed configurations serve to limit air leaks at the trim breaker 42 thereby ensuring a hermetic seal to maintain a vacuum within the vacuum insulated panel.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below are incorporated into and constitute part of this Detailed Description.

What is claimed is:

1. A vacuum insulated refrigeration appliance door, comprising:
a door wrapper forming an exterior of the appliance door, the door wrapper defining a wrapper flange extending along an edge of the door wrapper and defining a plurality of discrete wrapper protrusions that are spaced apart from one another along a longitudinal length of the wrapper flange;
a door liner defining a liner flange extending along an edge of the door liner, the liner flange defining a plurality of discrete liner protrusions that are spaced apart from one another along a longitudinal length of the liner flange, wherein the door wrapper and the door liner are in a spaced apart configuration, and wherein the wrapper flange and liner flange extend in the same direction;
a trim breaker defining a wrapper groove, a liner groove and a gasket groove, wherein the wrapper flange is centered within the wrapper groove and the liner flange is centered within the liner groove;
an adhesive positioned on opposite sides of each of the wrapper and liner flanges within each of the wrapper and liner grooves, respectively; and
a gasket, wherein a portion of the gasket is positioned within the gasket groove of the trim breaker.

2. The refrigeration appliance door of claim 1, wherein an air pressure between the door wrapper and the door liner is less than about 1 atm.

3. The refrigeration appliance door of claim 1, wherein the wrapper protrusions and the liner protrusions are configured to simultaneously contact opposite walls of the respective wrapper groove and the liner groove.

4. The refrigeration appliance door of claim 1, wherein the wrapper groove defines a center between inwardly-facing opposite side surfaces of the wrapper groove, and wherein the wrapper flange includes a planar central portion disposed in the wrapper groove at the center thereof, and wherein the wrapper protrusions extend in opposite directions from the planar central portion of the wrapper flange.

5. The refrigeration appliance door of claim 4, wherein the wrapper protrusions are substantially hemispherical and extend from the wrapper flange in opposite directions in an alternating manner.

6. The refrigeration appliance door of claim 1, wherein the trim breaker comprises a polymer.

7. An appliance door, comprising:
a metallic door wrapper forming an exterior of the appliance door, the door wrapper defining a wrapper flange extending along an edge of the door wrapper and defining a plurality of discrete wrapper protrusions that are spaced apart from each other along a longitudinal length of the wrapper flange;
a metallic door liner defining a liner flange extending along an edge of the door liner, the liner flange defining a plurality of discrete liner protrusions that are spaced apart from each other along a longitudinal length of the liner flange, wherein the door wrapper and the door liner are in a spaced apart configuration;
a thermally insulative material disposed between the door wrapper and the door liner;
a polymeric trim breaker defining a wrapper groove and a liner groove, wherein the wrapper flange is centered within the wrapper groove and forms gaps between the wrapper flange and opposite sidewalls of the wrapper groove on opposite sides of the wrapper flange, the gaps extending transverse to the wrapper flange and the liner flange is centered within the liner groove and forms gaps between the liner flange and opposite sidewalls of the liner groove on opposite sides of the liner flange, the gaps extending transverse to the liner flange and wherein the wrapper groove and the liner groove open in the same direction; and
an adhesive positioned within each of the wrapper and liner grooves in the gaps on opposite sides of the wrapper and liner flanges, respectively, and wherein the adhesive is a different material than the thermally insulative material.

8. The appliance door of claim 7, wherein an air pressure between the door wrapper and the door liner is less than about 1 atm.

9. The appliance door of claim 8, wherein the adhesive is positioned on opposite sides of each of the wrapper and liner flanges.

10. The appliance door of claim 7, wherein the wrapper protrusions and the liner protrusions are generally rounded and configured to contact walls of the respective wrapper and liner grooves.

11. The appliance door of claim 10, wherein the wrapper and liner protrusions are substantially hemispherical and integrally defined by the wrapper flange and liner flange, respectively.

12. The appliance door of claim 7, wherein the adhesive is filled between the wrapper protrusions within the wrapper groove, and wherein the wrapper protrusions simultaneously contact the opposite walls of the wrapper groove.

13. A vacuum insulated structure, comprising:
a wrapper defining a wrapper flange;
a liner defining a liner flange, the wrapper and the liner are in a spaced apart configuration;
a trim breaker defining a wrapper groove and a liner groove, wherein the wrapper groove and the liner groove open in the same direction;
a plurality of discrete liner protrusions defined the liner flange within the liner groove wherein the plurality of discrete liner protrusions are spaced-apart along a longitudinal length of the liner flange; and
a gasket groove defined in the trim breaker and disposed adjacent the wrapper groove.

14. The vacuum insulated structure of claim 13, wherein an air pressure between the wrapper and the liner is less than about 1 atm.

15. The vacuum insulated structure of claim 13, further comprising:
a plurality of wrapper protrusions defined by at least one of the wrapper flange and the trim breaker within the wrapper groove.

16. The vacuum insulated structure of claim 15, further comprising:
an adhesive, wherein the adhesive is filled between the liner protrusions within the liner groove.

17. The vacuum insulated structure of claim 16, wherein the liner protrusions extend in more than one direction from the liner flange.

18. The vacuum insulated structure of claim 15, wherein the wrapper protrusions are substantially hemispherical and extend from the wrapper flange in opposite directions in an alternating manner along a length of the wrapper flange.

19. The vacuum insulated structure of claim 18, wherein the wrapper protrusions and the liner protrusions are integrally defined by the wrapper and liner flanges.

\* \* \* \* \*